(12) United States Patent
Yamauchi

(10) Patent No.: US 8,345,765 B2
(45) Date of Patent: Jan. 1, 2013

(54) IMAGE CODING DISTORTION REDUCTION APPARATUS AND METHOD

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 12/715,933

(22) Filed: Mar. 2, 2010

(65) Prior Publication Data

US 2010/0246690 A1 Sep. 30, 2010

(30) Foreign Application Priority Data

Mar. 31, 2009 (JP) ................................. 2009-085887

(51) Int. Cl.
*H04N 7/18* (2006.01)
(52) U.S. Cl. .......... 375/240.16; 375/240.26; 375/240.29
(58) Field of Classification Search . 375/240.01–240.29
See application file for complete search history.

(56) References Cited

U.S. PATENT DOCUMENTS

2007/0230571 A1* 10/2007 Kodama ................... 375/240.12
2009/0257664 A1* 10/2009 Kao et al. ...................... 382/232

FOREIGN PATENT DOCUMENTS

| JP | 02-171091 | 7/1990 |
| JP | 04-307882 | 10/1992 |
| JP | 07-236140 | 9/1995 |
| JP | 08-084342 | 3/1996 |
| JP | 11-004366 | 1/1999 |
| JP | 2006-325155 A | 11/2006 |
| JP | 2007-129369 | 5/2007 |
| JP | 2007-525902 A | 9/2007 |
| JP | 4009650 B2 | 9/2007 |
| JP | 2008-042565 | 2/2008 |
| WO | WO-2004-112378 A1 | 12/2004 |

\* cited by examiner

*Primary Examiner* — Andy Rao
(74) *Attorney, Agent, or Firm* — Patterson & Sheridan, LLP

(57) ABSTRACT

According to one embodiment, the apparatus of the embodiment of the invention has following modules. A decoder decodes a coded moving image signal to obtain a decoded moving image signal. A coding implementation information acquisition module acquires coding implementation information used when the coding is carried out. A motion detector obtains a motion detection output indicating a motion of an image. A coding distortion reduction module has a plurality of kinds of distortion reducing characteristics which reduce a plurality of kinds of coding distortions included in the decoded moving image signal. A coding distortion reduction controller controls the plurality of kinds of distortion reducing characteristics in accordance with the output of the coding implementation information and the motion detection output.

9 Claims, 5 Drawing Sheets

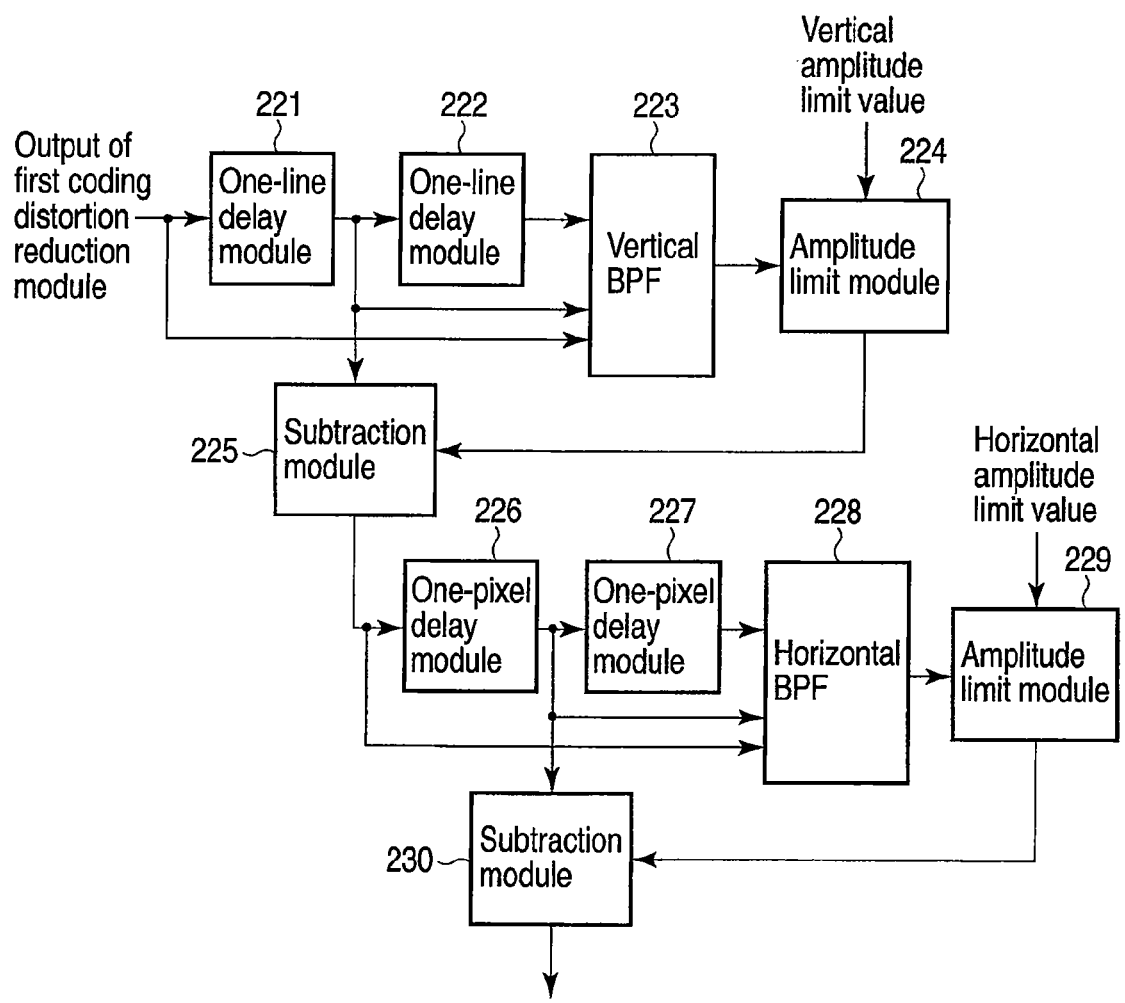
F I G. 3

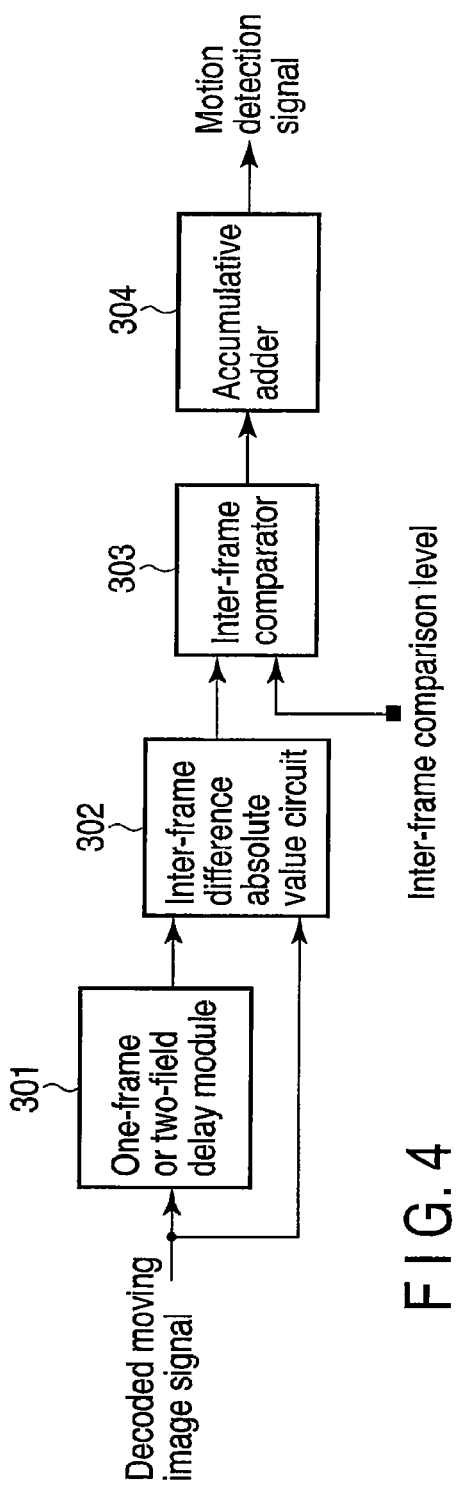
F I G. 4
F I G. 5B
F I G. 5A

US 8,345,765 B2

IMAGE CODING DISTORTION REDUCTION APPARATUS AND METHOD

CROSS-REFERENCE TO RELATED APPLICATIONS

This application is based upon and claims the benefit of priority from Japanese Patent Application No. 2009-085887, filed Mar. 31, 2009, the entire contents of which are incorporated herein by reference.

BACKGROUND

1. Field

One embodiment of the invention relates to an apparatus and method for image coding distortion reduction.

2. Description of the Related Art

When moving images are transferred or recorded, the moving images are coded in order to increase transfer efficiency and compression efficiency. On the other hand, on a receiving or reproducing side where the coded moving images are received, the moving images are decoded. In this case, distortion reduction processing is performed to reduce a coding distortion.

For example, in an image coding distortion reduction apparatus disclosed in PCT National Publication No. 2007-525902, a coding artifact (ringing distortion reduction processing and block distortion reduction processing) is controlled in accordance with a value (global indicator value) which is obtained by a given computation expression using, for example, quantization information and coding amount information. The ringing distortion reduction processing and the block distortion reduction processing are uniformly controlled by the global indicator value.

Another technique for reducing coding distortion is described in Jpn. Pat. Appln. KOKAI Publication No. 2006-325155. According to this document, image processing using motion compensation is performed in accordance with the appearance of the coding distortion.

According to a conventional method of reducing a distortion resulting from the coding of moving images, even if ringing distortion is generated in a situation where an image is almost static, where a coding amount is reduced by motion compensation and where block distortion is not easily generated, the ringing distortion cannot be sufficiently reduced or unnecessary block distortion reduction processing is performed, so that the image may be deteriorated.

Furthermore, even if the distortion reduction processing is always performed uniformly, the distortion reduction efficiency may vary depending on how moving images are coded.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is a diagram showing a block configuration example of a second coding distortion reduction module 12 in FIG. 1;

FIG. 4 is a diagram showing a configuration example of a motion detector 23 in FIG. 1;

FIGS. 5A and 5B are explanatory graphs showing specific examples of the operations of the first coding distortion reduction module and the second coding distortion reduction module in FIG. 1.

DETAILED DESCRIPTION

Various embodiments according to the invention will be described hereinafter with reference to the accompanying drawings.

The embodiments of the invention are intended to provide an apparatus and method for image coding distortion reduction to improve distortion reduction effects so that distortion reduction operations for distortions different in characteristics, such as ringing distortion and block distortion, may not adversely affect each other. The embodiments of the invention are also intended to provide an apparatus and method for image coding distortion reduction to change a distortion reduction operation depending on how moving images are coded and thereby obtain an appropriate distortion reduction.

The embodiments of the invention are compatible with a plurality of moving image coding schemes. The apparatus of the invention comprises a decoder configured to decode a coded moving image signal to obtain a decoded moving image signal, and a coding implementation information acquisition module configured to acquire, from control information added to the coded moving image signal, coding implementation information used when the coding is carried out.

The apparatus of the invention further comprises a motion detector configured to obtain a motion detection output indicating a motion of an image of the decoded moving image signal, and a coding distortion reduction module configured to have a plurality of kinds of distortion reducing characteristics which reduce a plurality of kinds of coding distortions included in the decoded moving image signal.

The apparatus of the invention additionally comprises a coding distortion reduction controller configured to control the plurality of kinds of distortion reducing characteristics of the distortion reduction module in accordance with the output of the coding implementation information from the coding implementation information acquisition module and the motion detection output from the motion detector.

According to the embodiments of the invention mentioned above, the distortion reducing effect characteristics are adaptively controlled in accordance with, for example, a coding scheme, a picture type and quantization information, so that the distortion reduction operations for distortions resulting from different factors do not adversely affect each other, and satisfactory distortion reduction processing can be performed.

A specific description is given below.

Figure 1:
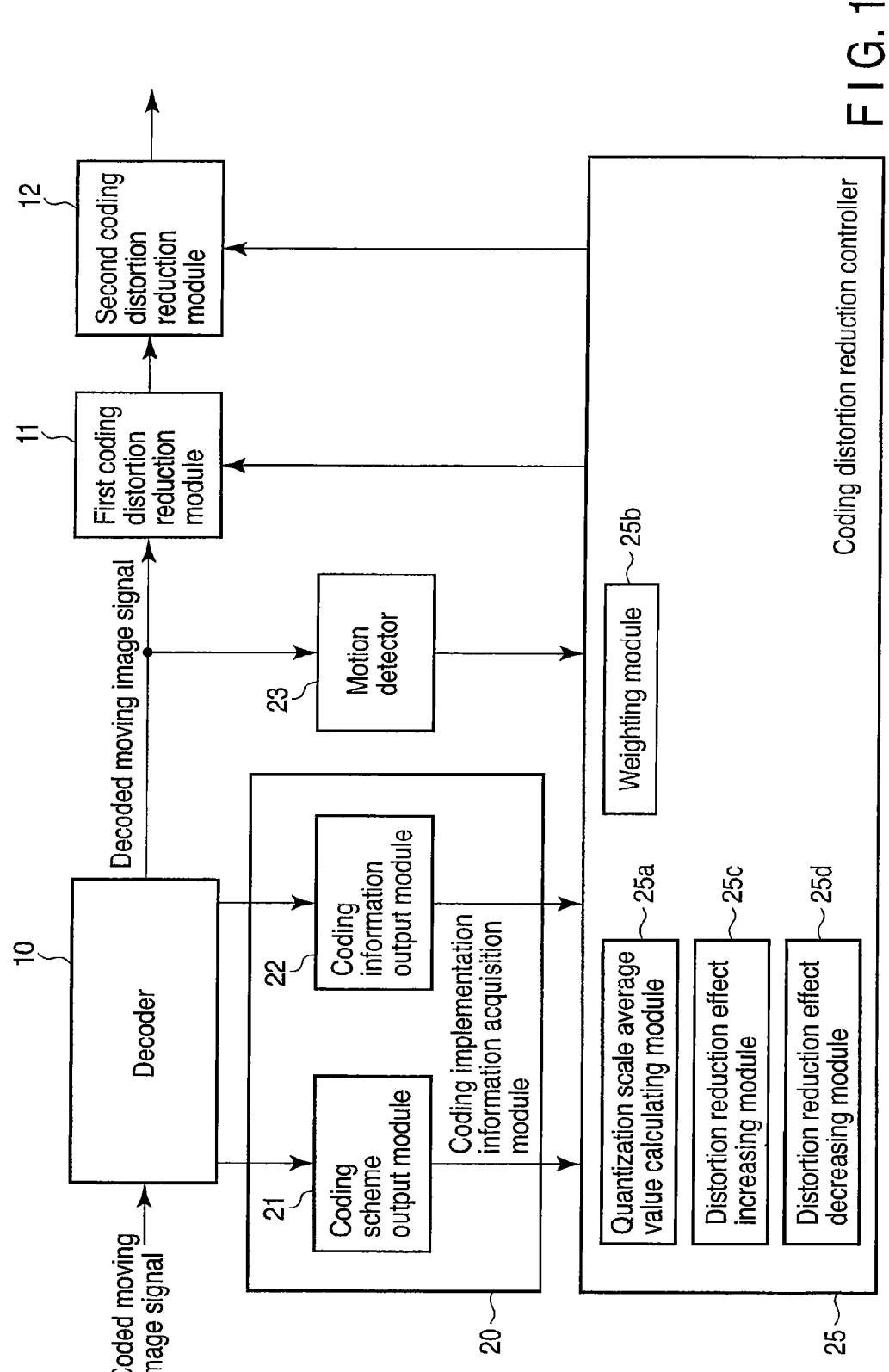
FIG. 1 is a block diagram showing one embodiment of the present invention.

The embodiment of the invention is described in detail below. A first example of a moving image coding distortion reduction apparatus of the present invention is shown in FIG. 1. A coded moving image signal which is coded by a moving image coding scheme is decoded by a decoder 10 and then output as a decoded moving image signal. That is, this decoder decodes the coded moving image signal to obtain a decoded moving image signal, and also outputs, as coding characteristic information, a picture type or quantization information of a field or frame of the decoded moving image signal obtained when the coded moving image signal is decoded.

A coding implementation information acquisition module 20 acquires the coding characteristic information output by the decoder 10. The coding characteristic information is acquired so that this information is once sorted into a coding scheme output module 21 and a coding information output module 22 in accordance with the contents. The coding implementation information acquisition module 20 includes the coding scheme output module 21 and the coding information output module 22.

The coding scheme output module 21 acquires the kind of coding scheme of the coded moving image signal, for example, MPEG-2 or MPEG-4 AVC from the decoder 10, and outputs the same to a coding distortion reduction controller 25. Further, the coding information output module 22 acquires the picture type or quantization information (e.g., a field or frame average value of the quantization scale of a macro block) of each field or frame of a decoded moving image from the decoder 10, and outputs the same to the coding distortion reduction controller 25.

Furthermore, a motion detector 23 detects an inter-field or inter-frame motion for each field or frame of the decoded moving image signal output from the decoder 10, and outputs the same to the coding distortion reduction controller 25.

The decoded moving image signal output from the decoder 10 is input to a first coding distortion reduction module 11, and the decoded moving image signal which has undergone a distortion reduction in the first coding distortion reduction module 11 is input to a second coding distortion reduction module 12.

Figure 2A:
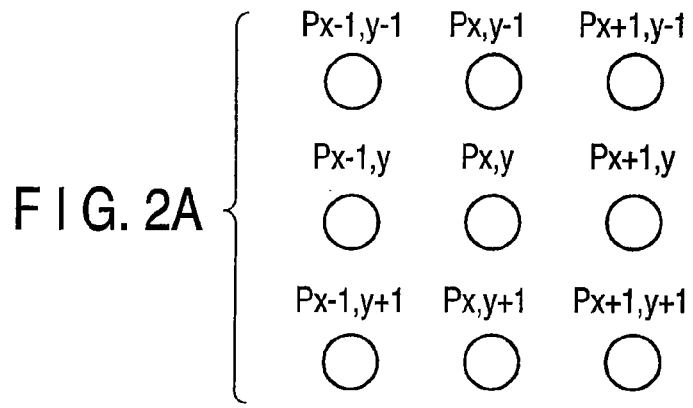
FIGS. 2A and 2B are diagrams showing a pixel arrangement example and a block configuration example to explain the function of a first coding distortion reduction module 11 in FIG. 1.
Figure 2B:
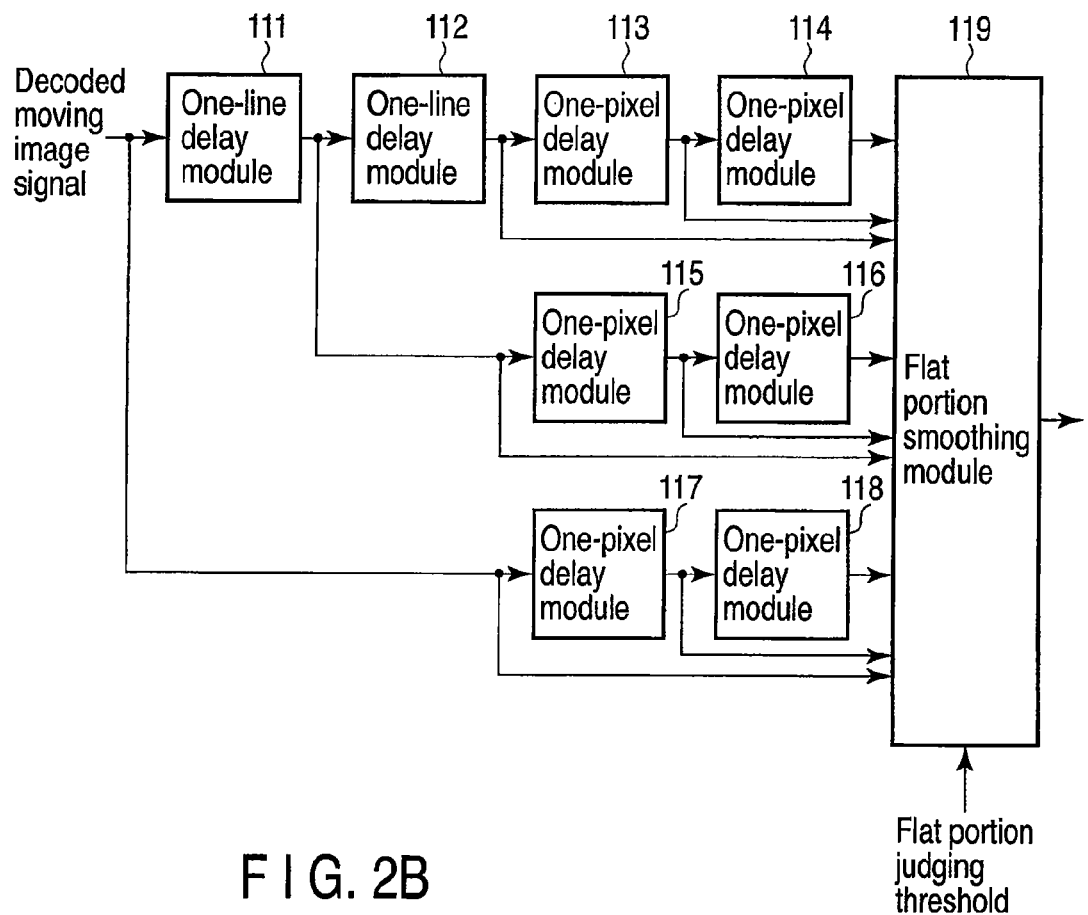

The first coding distortion reduction module 11 uses, for example, a ringing distortion reduction module as shown in FIG. 2B. The second coding distortion reduction module 12 uses, for example, a block distortion reduction module as shown in FIG. 3.

Here, a first example of the ringing distortion reduction module according to the present invention is described with FIGS. 2A and 2B. In this example, an edge preserving type smoothing module is shown which performs smoothing in a region where a spatial change of an image is smaller than a flat portion judging threshold. That is, the smoothing module performs smoothing in a region where the amplitude of a signal is low. In this smoothing, a central pixel $P_{x,y}$ is smoothed in a region having a total of nine pixels where there are three pixels vertically and three pixels horizontally as shown in FIG. 2A.

The configuration of the first coding distortion reduction module 11 (ringing distortion reduction module) is shown in FIG. 2B. An input decoded moving image signal is input to a one-line delay module 111, and an output of the one-line delay module 111 is input to a subsequent one-line delay module 112. The input decoded moving image signal is also input to a one-pixel delay module 117, and the output of the one-line delay module 111 is also input to a one-pixel delay module 115, while an output of the next one-line delay module 112 is input to a one-pixel delay module 113.

An output signal of the one-pixel delay module 113 is input to a one-pixel delay module 114. Further, the input signal and the output signal of the one-pixel delay module 113 and an output signal of the one-pixel delay module 114 are input to a flat portion smoothing module 119. An output signal of the one-pixel delay module 115 is input to a one-pixel delay module 116. The input signal and the output signal of the one-pixel delay module 115 and an output signal of the one-pixel delay module 116 are input to the flat portion smoothing module 119. An output signal of the one-pixel delay module 117 is input to a one-pixel delay module 118. Moreover, the input signal and the output signal of the one-pixel delay module 117 and an output signal of the one-pixel delay module 118 are input to the flat portion smoothing module 119.

According to the configuration described above, the region having a total of nine pixels where there are three pixels vertically and three pixels horizontally as shown in FIG. 2A is simultaneously input to the flat portion smoothing module 119, and, for example, the central pixel $P_{x,y}$ is smoothed. That is, the difference between the central pixel $P_{x,y}$ and each of the surrounding pixels $P_{x-1,y-1}, P_{x-1,y}, P_{x-1,y+1}, P_{x,y-1}, P_{x,y+1}, P_{x+1,y-1}, P_{x+1,y},$ and $P_{x+1,y+1}$ is found, and only the surrounding pixel having a difference smaller than the flat portion judging threshold is used for smoothing. The smoothing is performed using, for example, the average value of the surrounding pixel targeted for the smoothing. The flat portion judging threshold is provided from the coding distortion reduction controller 25 in accordance with a control characteristic described later.

If the flat portion judging threshold is increased, a ringing distortion reduction effect is increased, but the decoded moving image signal will be blurred.

Next, a first example of the second coding distortion reduction module 12 (block distortion reduction module) according to the present invention is described with FIG. 3. In this example, the block distortion reduction module is shown. The block distortion reduction module subtracts a vertical spatial high frequency component equal to or less than a vertical amplitude limit value to smooth a vertical step of a block distortion, and then subtracts a horizontal spatial high frequency component equal to or less than a horizontal amplitude limit value to smooth a horizontal step of the block distortion. If the vertical amplitude limit value and the horizontal amplitude limit value are increased, a block distortion reduction effect is increased, but the decoded moving image signal will be blurred.

In a specific configuration, an output from the first coding distortion reduction module 11 is input to a one-line delay module 221. An output of the one-line delay module 221 is input to a next one-line delay module 222. The input signal and the output signal of the one-line delay module 221 and an output signal of the next one-line delay module 222 are input to a vertical band filter 223. An output signal of the vertical band filter 223 is input to an amplitude limit module 224, and the signal the amplitude of which is limited here is input to a subtraction module 225. The subtraction module 225 subtracts, from the output signal of the one-line delay module 221, the output signal from the amplitude limit module 224, and outputs the result.

The output of the subtraction module 225 is input to a one-pixel delay module 226. An output signal of the one-pixel delay module 226 is input to a one-pixel delay module 227. The input signal and the output signal of the one-pixel delay module 226 and an output signal of the one-pixel delay module 227 are input to a horizontal band filter 228 where the bands of these signals are limited. An output signal of the horizontal band filter 228 is input to an amplitude limit module 229, and the signal, the amplitude of which is limited here, is input to a subtraction module 230. The subtraction module 230 subtracts, from the output signal of the one-pixel delay module 226, the output signal from the amplitude limit module 229, and outputs the result.

In the above-described circuit, if the vertical amplitude limit value and the horizontal amplitude limit value are increased, the block distortion reduction effect is increased, but the decoded moving image signal will be blurred.

Next, a first example of the motion detector 23 according to the present invention is shown in FIG. 4. The decoded moving image signal is input to a one-frame or two-field delay module 301, and also input to an inter-frame difference absolute value circuit 302. The inter-frame difference absolute value circuit 302 obtains an absolute value of the difference between the decoded moving image signal from the delay module 301 and the previous directly input decoded moving image signal. The absolute value output is input to an inter-frame comparator 303, and compared with an inter-frame comparison level.

When there is a value higher than the comparison level, the inter-frame comparator 303 inputs the result of the judgment of this value to an accumulative adder 304. The accumulative adder 304 outputs a frame motion detection signal corresponding to an accumulation result.

The operation is specifically described below. When the decoded moving image signal is an interlace signal, this signal is delayed two fields by the one-frame or two-field delay module 301. When the decoded moving image signal is a progressive signal, this signal is delayed one frame by the one-frame or two-field delay module 301. A motion is detected between this delayed signal and the decoded moving image signal. First, an inter-field or inter-frame difference absolute value for two pixels is found in the inter-frame difference absolute value circuit 302. When this value is higher than the inter-frame comparison level, a flag indicating dynamic pixels is output. When the value is equal to or less than the inter-frame comparison level, a flag indicating static pixels is output. The number of pixels indicating the dynamic pixels is accumulatively added for one field or frame in the accumulative adder 304. The accumulative addition value is output as a motion detection signal, and when this value is rises, it means that the value of a motion amount becomes larger.

The motion detector 23 may be designed to perform no write operation even in the case of a 2-3 pull-down signal in which a film picture is converted to a video picture signal. In the case of such a converted picture signal, a frame interval for obtaining an inter-frame difference may be selectable or changeable.

The explanation returns to FIG. 1. The coding distortion reduction controller 25 controls the coding distortion reducing characteristics of the coding distortion reduction modules 11 and 12, in accordance with the coding characteristic information and the motion detection output. That is, the coding distortion reduction controller 25 uses the output of the coding scheme output module 21, the output of the coding information output module 22 and the output of the motion detector 23 to control the flat portion judging threshold of the ringing distortion reduction module (FIG. 2B), and the vertical amplitude limit value and the horizontal amplitude limit value of the block distortion reduction module (FIG. 3).

The coding distortion reduction controller 25 performs control, for example, as shown in FIG. 5. A first example of the control performed by the coding distortion reduction controller 25 according to the present invention is described with FIG. 5.

FIG. 5A shows an example of the control characteristic of the ringing distortion reduction module (FIG. 2B), and FIG. 5B shows an example of the control characteristic of the block distortion reduction module (FIG. 3).

If a high (or large) quantization step is used, a coding distortion is easily generated, and a block distortion is easily generated particularly when a image motion is large. Thus, as shown in FIG. 5B, the block distortion reduction effect is increased when the high quantization step is used and when a motion amount is large. If the vertical amplitude limit value and the horizontal amplitude limit value in FIG. 3 are increased, the block distortion reduction effect is increased.

On the other hand, even in a static situation, the ringing distortion is easily generated if a low (or small) quantization step is used. Thus, as shown in FIG. 5A, the ringing distortion reduction effect is increased in the case of a small motion amount when the low quantization step is used. If the flat portion judging threshold in FIG. 2B is increased, the ringing distortion reduction effect is increased.

This makes it possible to suitably reduce the block distortion and the ringing distortion and to avoid unnecessary excessive blurring of an image.

That is, the distortion reducing effect characteristics are adaptively controlled in accordance with, for example, a coding scheme, a picture type and quantization information, so that the distortion reduction operations for distortions resulting from different factors do not adversely affect each other, and satisfactory distortion reduction processing can be performed.

In a conventional moving image coding distortion reduction apparatus, ringing distortion reduction processing and block distortion reduction processing are controlled in the same manner in accordance with, for example, quantization information and coding amount information. Therefore, even if a ringing distortion is generated in a situation where an image is almost static, where the coding amount is reduced by a motion compensation and where a block distortion is not easily generated, the ringing distortion cannot be sufficiently reduced or unnecessary block distortion reduction processing is performed, so that the image may be deteriorated.

According to the present invention, the ringing distortion can be suitably reduced even in such a situation, and the unnecessary block distortion reduction processing can be avoided.

The following various elements and control forms can be used to obtain the operation characteristics shown in FIGS. 5A and 5B.

The quantization information from the coding information output module 22 is used. In this case, an average value in a field or frame of a decoded moving image signal of the quantization scale of a macro block is used as the quantization information in FIGS. 5A and 5B. In this case, the entire image frame is subjected to an average block distortion reduction. The average value is obtained by a quantization scale average value module 25a.

The quantization information from the coding information output module 22 is used. In this case weighting may be used according to a picture type such as I, P and B picture obtained from the coding information output module 22. Because a scale of the quantization step and the degree of effect on a coding distortion are influenced by the picture type, therefore it is prefer to also change the sensitivity of the operation characteristic in FIGS. 5A and 5B according to the picture type rather than to fix the characteristic, as the result it is possible to obtain an appropriate distortion reduction processing. The weighting is performed by a weighting module 25b.

In the embodiment, when the quantization information indicates that a greater quantization step of a field or frame of a decoded moving image signal is used, the coding distortion reduction controller 25 controls to increase the distortion reduction effect of the coding distortion reduction modules 11, 12. A distortion reduction effect increasing module 25c plays a major role in performing this control on the basis of the characteristics in FIGS. 5A and 5B.

Furthermore, in the embodiment, when the output of the coding scheme output module 21 indicates the MPEG-4 AVC format, the block distortion reduction effect is decreased or eliminated. The reason for this is that a corresponding decoding unit in the decoder 10 is originally provided with a block distortion reduction circuit in the case of the MPEG-4 AVC format.

Still further, in the embodiment, the ringing distortion reduction module performs smoothing in a region where a spatial change of an image is smaller than a given threshold. The reason for this is that the degree of the generation of ringing is considered.

Still further, in the embodiment, the motion detector 23 divides a screen into small regions, and detects a motion of an image in the small region at the same position between a current field and a field which is two fields back from the current field, or detects a motion of an image in the small region at the same position between a current frame and a frame which is one frame back from the current frame, thereby determining an inter-field or inter-frame motion on the basis of the number of small regions in which the image is judged to have been moved. Thus, a motion can also be accurately detected in the case of a signal having more noise or in the case where part of the screen is moving.

Further, this invention is not limited to the above-described example. The characteristics shown in FIGS. 5A and 5B may be configured to be adjustable by a user. In this case, for example, the characteristic shown in FIG. 5A may be configured to be shiftable in the direction of an arrow A1 or an arrow A2 by, for example, an external adjustment. The characteristic shown in FIG. 5B may also be configured to be shiftable in the direction of an arrow B1 or an arrow B2. This adjustment makes it possible to change the sensitivity of the distortion reduction operation.

Furthermore, this invention is not limited to the above-described embodiment, and various modifications can be made. An example of an application of this invention to a television receiver is shown in FIG. 6.

Figure 6:
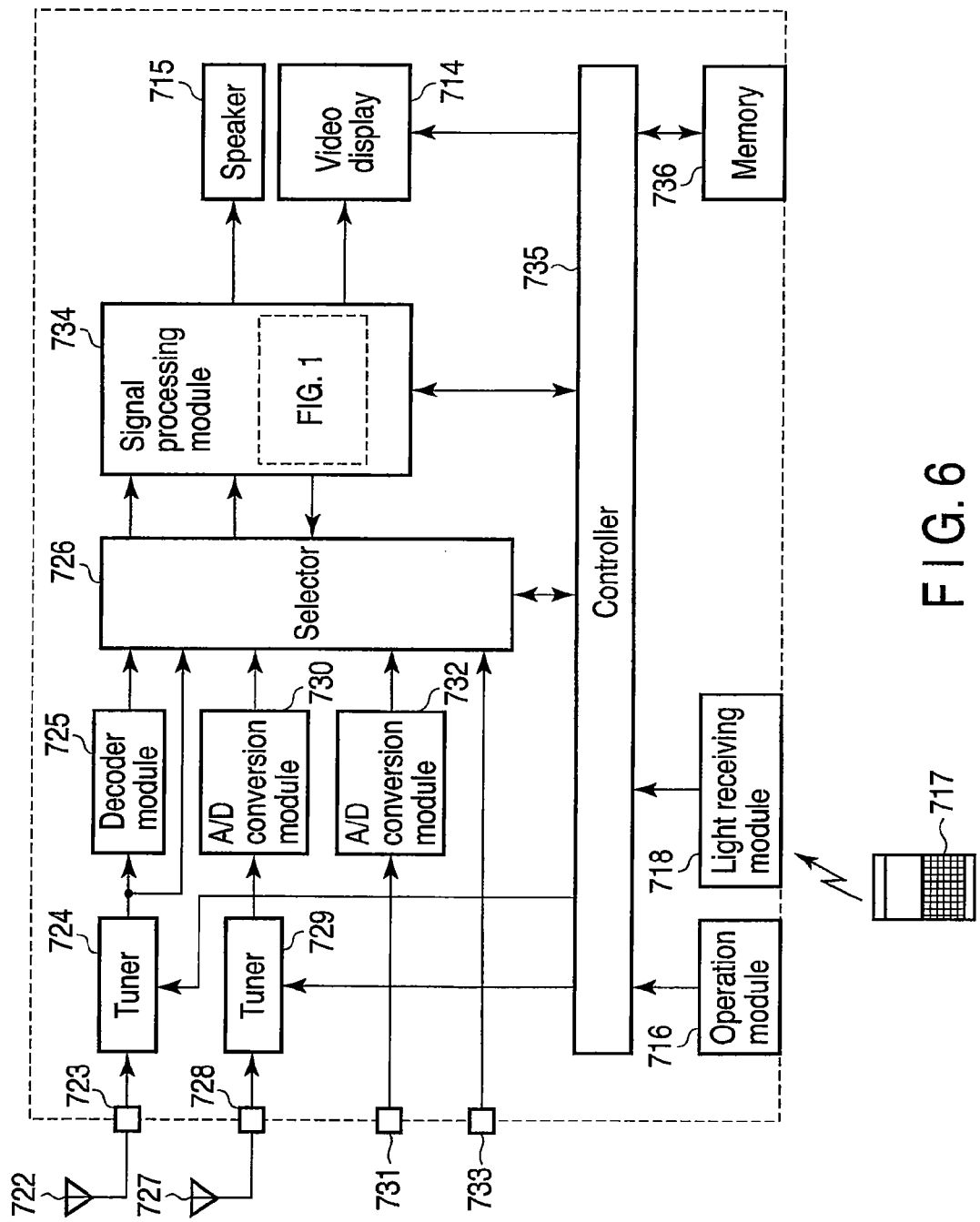
FIG. 6 is a diagram showing a configuration example of a television receiver to which the present invention is applied.

FIG. 6 schematically shows a signal processing system of a television broadcast receiver incorporating the apparatus of the present invention. The moving image coding distortion reduction apparatus described with FIG. 1 is provided in a signal processing module 734. Digital television broadcast signals received by an antenna 722 for receiving digital television broadcasts are supplied to a tuner 724 via an input terminal 723. This tuner 724 tunes in and demodulates a signal of a desired channel out of the input digital television broadcast signals.

The output of the tuner 724 is decoded by a decoder 725, and is also directly supplied to a selector 726. Video, audio, and other information are separated from this signal, and the video and audio information can be recorded in an HDD unit (not shown) via a controller 735.

Analog television broadcast signals received by an antenna 727 for receiving analog television broadcasts are supplied to a tuner 729 via an input terminal 728. This tuner 729 tunes in and demodulates a signal of a desired channel out of the input analog television broadcast signals. Then, the signal output from the tuner 729 is digitized by an analog/digital (A/D) conversion module 730, and output to the selector 726.

Further, analog video and audio signals supplied to an input terminal 731 for analog signals are supplied to and digitized by an A/D conversion module 732, and output to the selector 726. Further, digital video and audio signals supplied to an input terminal 733 for digital signals are supplied to the selector 726 as they are.

The selector 726 selects one of four kinds of input digital video and audio signals, and supplies the selected signal to the signal processing module 734. This signal processing module 734 subjects the input digital video signal to predetermined signal processing, and provides the processed signal to video display in a video display module 714. As the video display module 714, a flat panel display such as a liquid crystal display or plasma display is used. Further, the signal processing module 734 subjects the input digital audio signal to predetermined signal processing, and outputs the signal to a speaker 715 in an analog form, thereby reproducing sound.

Here, in this television broadcast receiver, the controller 735 has overall control of various operations including the various receiving operations described above. This controller 735 is a microprocessor having, for example, a central processing unit (CPU) therein. The controller 735 receives operation information from an operation module 716 or receives operation information sent from a remote controller 717 via a light receiving module 718, and thereby controls various modules so that the contents of the operation are reflected.

In this case, the controller 735 uses a memory 736. This memory 736 mainly includes a read only memory (ROM) storing a control program executed by the CPU, a random access memory (RAM) for providing a work area to the CPU, and a nonvolatile memory storing various kinds of setting information and control information.

This invention can be used in various fields where image signals are processed, and is applicable to, for example, a set-top box, a recorder/reproducer, a computer having an image processing module, a server, or a television receiver.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A moving image coding distortion reduction apparatus comprising:
a decoder configured to decode a coded moving image signal to obtain a decoded moving image signal, and output, as coding characteristic information, quantization information of a field or frame of the decoded moving image signal, that is obtained when the coded moving image signal is decoded;
a motion detector configured to obtain a motion detection output indicating an inter-field or inter-frame motion of a field or frame of the decoded moving image signal;
a coding distortion reduction module configured to receive the decoded moving image signal, the coding distortion reduction module having a ringing distortion reduction module that reduces a ringing distortion in the decoded moving image signal, and a block distortion reduction module that reduces a block distortion in the decoded moving image signal; and
a coding distortion reduction controller configured to control the ringing distortion reduction module and the block distortion reduction module,
wherein the coding distortion reduction controller increases an effect of the block distortion reduction module when the motion detection output indicates an increase in the inter-field or inter-frame motion of the field or frame of the decoded moving image signal or when the quantization information indicates an increase in a setting quantization step of the field or frame of the decoded moving image signal, and the coding distortion reduction controller increases an effect of the ringing distortion reduction module when the motion detection output indicates a decrease in the inter-field or inter-frame motion of the field or frame of the decoded moving image signal or when the quantization information indicates an increase in a setting quantization step of the field or frame of the decoded moving image signal.

2. The moving image coding distortion reduction apparatus of claim 1, wherein the decoder is compatible with a plurality of moving image coding schemes, and the coding characteristic information further indicates a kind of moving image coding scheme of the decoded moving image signal, and
the coding distortion reduction controller controls and decreases an effect of the block distortion reduction module when the kind of moving image coding scheme is an MPEG-4 AVC format.

3. The moving image coding distortion reduction apparatus of claim 1, wherein an average value in the field or frame of the decoded moving image signal of a quantization scale of a macro block is used as the quantization information.

4. The moving image coding distortion reduction apparatus of claim 1, wherein the quantization information is weighted according to a picture type of the image.

5. The moving image coding distortion reduction apparatus of claim 1, wherein the motion detector determines the inter-field or inter-frame motion on the basis of a number of small regions in which the image is judged to have moved by dividing a screen into small regions and detecting a motion of an image in a small region at the same position between a current field and a field which is two fields back from the current field, or a motion of an image in a small region at the same position between a current frame and a frame which is one frame back from the current frame.

6. The moving image coding distortion reduction apparatus of claim 1, wherein the coding distortion reduction controller decreases or eliminates an effect of the block distortion reduction module when the coding characteristic information indicates that the coded moving image signal is coded in an MPEG-4 AVC format.

7. The moving image coding distortion reduction apparatus of claim 1, wherein the ringing distortion reduction module performs smoothing in a region where a spatial change of an image is smaller than a given threshold.

8. A moving image coding distortion reduction method comprising:
   decoding a coded moving image signal to obtain a decoded moving image signal;
   outputting, as coding characteristic information, quantization information of a field or frame of the decoded moving image signal, that is obtained when the coded moving image signal is decoded;
   obtaining a motion detection output indicating an inter-field or inter-frame motion of a field or frame of the decoded moving image signal; and
   reducing a ringing distortion and a block distortion in the decoded moving image signal,
   wherein
   an effect of the block distortion reduction is increased when the motion detection output indicates an increase in the inter-field or inter-frame motion of the field or frame of the decoded moving image signal or when the quantization information indicates an increase in a setting quantization step of the field or frame of the decoded moving image signal, and
   an effect of the ringing distortion reduction is increased when the motion detection output indicates a decrease in the inter-field or inter-frame motion of the field or frame of the decoded moving image signal or when the quantization information indicates an increase in a setting quantization step of the field or frame of the decoded moving image signal.

9. A display apparatus comprising:
a signal processor including the moving image coding distortion reduction apparatus of claim 1; and
a display module to which the decoded moving image signal with the reduced coding distortion is inputted.

* * * * *